United States Patent
He et al.

(10) Patent No.: US 8,621,568 B2
(45) Date of Patent: *Dec. 31, 2013

(54) WAN MODULE BASED REMOTE WAKEUP SYSTEM AND TERMINAL THEREOF

(75) Inventors: Zhiqiang He, Beijing (CN); Xingwen Chen, Beijing (CN); Jiangwei Zhong, Beijing (CN); Hai Wang, Beijing (CN); Xiaolin Zhang, Beijing (CN); Ying Liang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1009 days.

This patent is subject to a terminal disclaimer.

(21) Appl. No.: 11/865,485

(22) Filed: Oct. 1, 2007

(65) Prior Publication Data

US 2008/0092248 A1 Apr. 17, 2008

(30) Foreign Application Priority Data

Sep. 30, 2006 (CN) .......................... 2006 1 0141845

(51) Int. Cl.
*G06F 21/00* (2013.01)

(52) U.S. Cl.
USPC ............... 726/3; 713/201; 713/300; 455/466; 455/412; 370/464; 370/311

(58) Field of Classification Search
USPC ............................................................ 726/3
See application file for complete search history.

(56) References Cited

U.S. PATENT DOCUMENTS

| | | | |
|---|---|---|---|
| 6,002,918 A * | 12/1999 | Heiman et al. ............... | 340/7.38 |
| 6,192,230 B1 * | 2/2001 | van Bokhorst et al. .... | 455/343.3 |
| 6,553,336 B1 * | 4/2003 | Johnson et al. ............... | 702/188 |
| 6,665,520 B2 * | 12/2003 | Romans ....................... | 455/13.4 |
| 6,851,068 B2 * | 2/2005 | Jochiong et al. .............. | 713/330 |
| 7,882,255 B2 * | 2/2011 | Sood et al. ..................... | 709/230 |
| 8,238,233 B2 * | 8/2012 | Weast ............................ | 370/229 |
| 2002/0082665 A1 * | 6/2002 | Haller et al. ..................... | 607/60 |
| 2004/0068666 A1 * | 4/2004 | Tosey ............................. | 713/201 |
| 2004/0128310 A1 * | 7/2004 | Zmudzinski et al. ......... | 707/102 |

(Continued)

FOREIGN PATENT DOCUMENTS

CN 1716879 A 1/2006

OTHER PUBLICATIONS

The intelligent stb-implementation in digital home|http://ieeexplore.ieee.org/stamp/stamp.jsp?tp=&arnumber=4365450|Ge et al.|2007|pp. 1-6.*

(Continued)

*Primary Examiner* — Mahfuzur Rahman
(74) *Attorney, Agent, or Firm* — Sills, Cummis & Gross P.C.

(57) ABSTRACT

A WAN module based remote wakeup system and apparatus comprise a terminal including a security control module connected to an embedded controller, a power supply module and a serial port bus led from an WAN module side by a bus connection module, respectively, and the power supply module is connected to the bus connection module. The power supply module is adapted to supply power to the security control module and the bus connection module. The security control module is adapted to perform security verification on information carried by a signal received on the serial port bus led from the bus connection module, and to generate a wakeup signal and send it to the embedded controller if the security verification is successful. The embedded controller is adapted to start the terminal according to the received wakeup signal.

6 Claims, 2 Drawing Sheets

(56) References Cited

U.S. PATENT DOCUMENTS

2004/0203606 A1* 10/2004 Souissi et al. ............. 455/412.1
2004/0233930 A1* 11/2004 Colby, Jr. .................... 370/464
2005/0085245 A1* 4/2005 Danneels .................... 455/466
2005/0223248 A1 10/2005 Lim et al.
2008/0268880 A1* 10/2008 Ong et al. ................... 455/466
2009/0197652 A1* 8/2009 Lundstrom et al. ......... 455/574

OTHER PUBLICATIONS

"Unattended Ground Stress Synthesis Monitoring Station for Qinghai-Tibet Railway", Journal of Geomechanics, vol. 12, No. 1, pp. 96-101 (Mar. 31, 2006 (w/English abstract).

* cited by examiner

WAN MODULE BASED REMOTE WAKEUP SYSTEM AND TERMINAL THEREOF

BACKGROUND OF THE INVENTION

1. Field of Invention

The present invention relates to WAN (Wireless Access Network) module based remote wakeup technology, and in particular to a WAN module based remote wakeup system and a terminal there of.

2. Description of Prior Art

The incessant development of GPRS (General Packet Radio Service), CDMA (Code Division Multiple Access), 3G (3rd Generation) technologies enables more convenient connection between a mobile terminal (e.g. a notebook computer) and the Internet. By inserting a communication card, i.e. WAN module, such as GPRS, CDMA or 3G wireless Network Interface Card (NIC) in an interface, such as USB, Cardbus or MiniPCIE) of a notebook computer, the mobile Internet log-on can be achieved while SMS (Short Messaging Service), phone call and the like can be performed on the notebook computer.

Therefore, WAN module has gradually come into the standard configuration of a notebook computer. A series of applications for remote wakeup and startup of a notebook computer via a mobile phone or another notebook computer have emerged these days. There are various methods of remotely waking up and starting a notebook computer by means of WAN module, and the basic idea is to detect the fluctuation in the operating current of WAN module.

Unfortunately, such detection solution has poor accuracy and stability. The major reason lies in that WAN module itself searches base stations periodically during its sleep status, and its operating current increases at the time of searching base stations, which may incur a malfunction of a WAN module based remote wakeup terminal. Also, such malfunction may occur due to variation in a terminal power supply or external electromagnetic interference.

Besides, there is no guarantee of security for this kind of solution. As long as a phone call comes in or a short message is received, power-on and wakeup signals are generated regardless of the authenticity of the incoming signals and without any essential security verification on these signals.

As a result, the technical problem to be solved is how to provide an accurate and secured WAN module based remote wakeup system and terminal.

SUMMARY OF THE INVENTION

The object of the present invention is to provide a WAN module based remote wakeup system and terminal for realizing WAN module-based remote wakeup accurately and safely.

To achieve the above object, the solution of the present invention is described as follows.

In an aspect of the invention, there is provided a WAN module based remote wakeup system comprising a terminal having an embedded controller, a power supply module and a bus connection module and a WAN module having a serial port unit, in which a serial port bus is led from the serial port unit by the WAN module to the bus connection module in the terminal, the terminal further includes a security control module connected to the embedded controller, the power supply module and a serial port bus led from the WAN module side by the bus connection module, respectively, and the power supply module is connected to the bus connection module;

Wherein said power supply module is adapted for supplying power to the security control module and the bus connection module;

Said security control module is adapted for performing security verification on information carried by a signal received on the serial port bus led from the bus connection module, and for generating a wakeup signal and sending it to the embedded controller if the security verification is successful; and Said embedded controller is adapted for starting the terminal according to the received wakeup signal.

In the system of the present invention, said security control module comprises a micro program controller for storing security verification information, performing security verification on information carried by a signal received on the serial port bus led from the bus connection module, and generating a wakeup signal and sending it to the embedded controller if the security verification is successful.

In the system of the present invention, said security control module comprises a storage unit for storing security verification information, and a micro program controller for reading the security verification information stored in the storage unit, performing security verification on information carried by a signal received on the serial port bus led from the bus connection module based on the read security verification information, and generating a wakeup signal and sending it to the embedded controller if the security verification is successful.

In the system of the present invention, said power supply module comprises a power supply adapter/battery unit, a voltage transformer connected to the power supply adapter/battery unit, the embedded controller, the micro program controller and the bus connection module, respectively, and a bus voltage transformer connected to the power supply adapter/battery unit, the embedded controller, the micro program controller and the bus connection module, respectively;

Said embedded controller is adapted for generating an enable signal for the voltage transformer to supply power to the security control module and the bus connection module when the terminal is in power-off or sleep status, and generating an enable signal for the bus voltage transformer to supply power to the security control module and the bus connection module when the terminal is in power-on status;

Said voltage transformer is adapted for reducing the voltage from the power supply adapter/battery unit according to the enable signal from the embedded controller so as to supply power to the security control module and the bus connection module;

Said bus voltage transformer is adapted for reducing the voltage from the power supply adapter/battery unit according to the enable signal from the embedded controller so as to supply power to the security control module and the bus connection module.

In the system of the present invention, said micro program controller is further adapted for, in the power-off or sleep status of the terminal, detecting whether a WAN module is inserted in the bus connection module, performing identity verification on the inserted WAN module, and sending an enable signal to the voltage transformer to stop the voltage transformer from supplying power to the security control module and the bus connection module if the identity verification on the WAN module fails.

In the system of the present invention, said terminal comprises a south bridge or PCMCIA/Cardbus controller, and said security control module further comprises a switching unit connected to the micro program controller, the south bridge or PCMCIA/Cardbus controller and the serial port bus led from the bus connection module, respectively.

In another aspect of the invention, there is provided a terminal supporting WAN module-based remote wakeup comprises a terminal having an embedded controller, a power supply module and a bus connection module, in which the terminal further includes a security control module connected to the embedded controller, the power supply module and a serial port bus led from the bus connection module, respectively, and the power supply module is connected to the bus connection module;

Wherein said power supply module is adapted for supplying power to the security control module and the bus connection module;

Said security control module is adapted for performing security verification on information carried by a signal received on the serial port bus led from the bus connection module, and for generating a wakeup signal and sending it to the embedded controller if the security verification is successful; and Said embedded controller is adapted for starting the terminal according to the received wakeup signal.

In the terminal of the present invention, said security control module comprises a micro program controller for storing security verification information, performing security verification on information carried by a signal received on the serial port bus led from the bus connection module, and generating a wakeup signal and sending it to the embedded controller if the security verification is successful.

In the terminal of the present invention, said security control module comprises a storage unit for storing security verification information, and a micro program controller for reading the security verification information stored in the storage unit, performing security verification on information carried by a signal received on the serial port bus led from the bus connection module based on the read security verification information, and generating a wakeup signal and sending it to the embedded controller if the security verification is successful.

In the terminal of the present invention, said power supply module comprises a power supply adapter/battery unit, a voltage transformer connected to the power supply adapter/battery unit, the embedded controller, the micro program controller and the bus connection module, respectively, and a bus voltage transformer connected to the power supply adapter/battery unit, the embedded controller, the micro program controller and the bus connection module, respectively;

Said embedded controller is adapted for generating an enable signal for the voltage transformer to supply power to the security control module and the bus connection module when the terminal is in power-off or sleep status, and generating an enable signal for the bus voltage transformer to supply power to the security control module and the bus connection module when the terminal is in power-on status;

Said voltage transformer is adapted for reducing the voltage from the power supply adapter/battery unit according to the enable signal from the embedded controller so as to supply power to the security control module and the bus connection module;

Said bus voltage transformer is adapted for reducing the voltage from the power supply adapter/battery unit according to the enable signal from the embedded controller so as to supply power to the security control module and the bus connection module.

In the terminal of the present invention, said micro program controller is further adapted for, in the power-off or sleep status of the terminal, detecting whether a WAN module is inserted in the bus connection module, performing identity verification on the inserted WAN module, and sending an enable signal to the voltage transformer to stop the voltage transformer from supplying power to the security control module and the bus connection module if the identity verification on the WAN module fails.

In the terminal of the present invention, the terminal comprises a south bridge or PCMCIA/Cardbus controller, and said security control module further comprises a switching unit connected to the micro program controller, the south bridge or PCMCIA/Cardbus controller and the serial port bus led from the bus connection module, respectively.

The system and terminal according to the present invention can realize an accurate and secured WAN module-based remote wakeup by using the security verification module in the terminal to perform security verification on the received signal.

The above objects, technical solutions and effects of the present invention will be further described with reference to embodiments and figures.

DETAILED DESCRIPTION OF THE PREFERRED EMBODIMENTS

Figure 1:
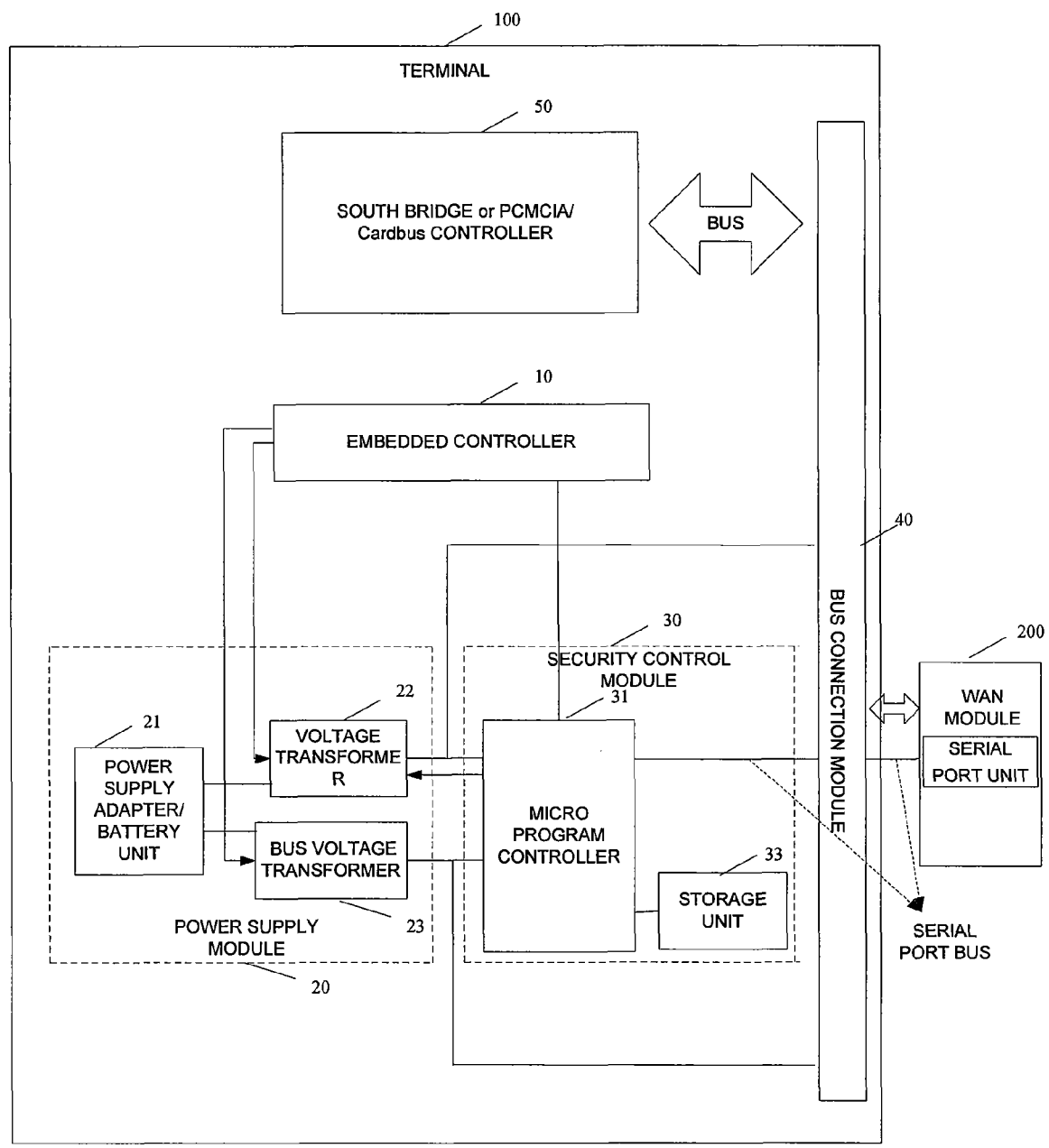
FIG. 1 is a schematic block diagram of a WAN module based remote wakeup system in an embodiment of the present invention.

Referring to FIG. 1, the WAN module based remote wakeup system in an embodiment of the present invention comprises a terminal 100 (e.g. PC, notebook computer, etc.), a WAN module 200. The terminal 100 includes an embedded controller 10, a power supply module 20, a security control module 30 and a bus connection module 40 (e.g. PCMCIA/Cardbus bus connector, miniPCIE bus connector). The WAN module 200 (e.g. GPRS, CDMA and 3G wireless network interface card) includes a serial port unit.

The power supply module 20 supplies power to the security control module and the bus connection module. The security control module performs security verification on information carried by a signal received from the bus connection module 40, generates a wakeup signal and sends it to the embedded controller 10 if the security verification is successful. The embedded controller 10 starts the terminal according to the received wakeup signal.

The power supply module 20 comprises a power supply adapter/battery unit 21, a voltage transformer 22 (e.g. DC-DC/LDO, switched voltage regulator/low voltage step-down regulator) and a bus voltage transformer 23 (e.g. Cardbus bus voltage transformer, miniPCIE bus voltage transformer).

The security control module 30 comprises a micro program controller 31 (e.g. Embedded controller (EC)) and a storage unit 33 (e.g. EEPROM, Flash ROM, etc.).

In the system shown in FIG. 1, the voltage transformer 22 in the power supply module 20 is connected to the embedded controller 10, the power supply adapter/battery unit 21, the micro program controller 31 and the bus connection module 40, respectively. The bus voltage transformer 23 is connected to the embedded controller 10, the power supply adapter/battery unit 21, the micro program controller 31 and the bus connection module 40, respectively. In addition, the micro program controller 31 is connected to the embedded controller 10, the bus connection module 40 and the storage unit 33, respectively. The WAN module 200 leads a serial port bus through the serial port unit (e.g. UART) to the bus connection module 40, which in turn leads a corresponding serial port bus to the micro program controller 31.

Next, the system as shown in FIG. 1 will be further described by the example in which a PCMCIA/Cardbus bus connector is used as the bus connection module 40, and a Cardbus bus voltage transformer is used as the bus voltage transformer 23.

First, a user can perform enable setting on the embedded controller 10 in the fashion of software or BIOS function setup such that the embedded controller 10 generates an enable signal only for the voltage transformer 22 in the power-off or sleep status of the terminal, and generates an enable signal only for the Cardbus bus voltage transformer in the power-on status of the terminal.

When the terminal 100 is in the power-off or sleep status, the embedded controller 10 generates an enable signal only for the voltage transformer 22 such that the voltage transformer 22 reduces the voltage from the power supply adapter/battery unit 21, for example, reduces the voltage to +5V, while supplying power to the micro program controller 31 and the PCMCIA/Cardbus bus connector 40.

At this point, if the micro program controller 31 identifies that the WAN module has been inserted by detecting the PCMCIA/Cardbus bus connector, the micro program controller 31 can first send a message for requesting connection establishment to the WAN module 200, and can send the message for requesting connection establishment again to the WAN module 200 if it does not receive a response message from the WAN module 200 within a predetermined response time, for example, the micro program controller 31 can re-send the message for requesting connection establishment to the WAN module 200 for three times. If the micro program controller 31 does not receive a response message from the WAN module 200 all the time, the identification on the WAN module fails, that is, the WAN module is a conventional WAN module having no support to the function of remotely waking up a terminal. In this case, the micro program controller 31 sends an enable signal to the voltage transformer 22 so as to stop the voltage transformer 22 from supplying power to the security control module 30 and the PCMCIA/Cardbus bus connector.

During the identification process, if the verification on the WAN module identification information carried in the received response message is successful, that is, the identification on the WAN module is successful, the WAN module 200, upon receiving SMS or an incoming phone call, sends relevant information on the serial port bus led from the serial port unit and leads the serial port bus to the micro program controller 31 through the PCMCIA/Cardbus bus connector 40 in the terminal. Then, the micro program controller 31 sends a command for obtaining information of the SMS or incoming phone call on the serial port bus to the WAN module. The micro program controller 31 extracts user information and performs security verification on the extracted user information based on the security verification information obtained from the storage unit 33. Here, the security verification information obtained from the storage unit 33 can be preset in the storage unit 33, or configured or updated in the storage unit 33 by the user after the terminal is powered on.

If the security verification succeeds, the micro program controller 31 sends an ON signal to the embedded controller 10, which in turn starts or wakes up the terminal and generates an enable signal only for the Cardbus bus voltage transformer. Then, the Cardbus bus voltage transformer reduces the voltage from the power supply adapter/battery unit 21, for example, reduces the voltage to +5V, so as to supply power to the micro program controller 31 and the PCMCIA/Cardbus bus connector 40.

If the security verification fails, the micro program controller 31 abandons the user information.

In the above system, the security verification information stored in the storage unit 33 can be stored in the micro program controller 31 with no need for the storage unit. In this case, the security verification information can also be preset or configured or updated by the user after the power-on of the terminal. When a miniPCIE bus connector is used as the bus connection module 40 and a miniPCIE bus voltage transformer is used as the bus voltage transformer 23 in the above system, the operation process of the system according to the embodiment of the present invention resembles the above description and will not be repeated here.

Figure 2:
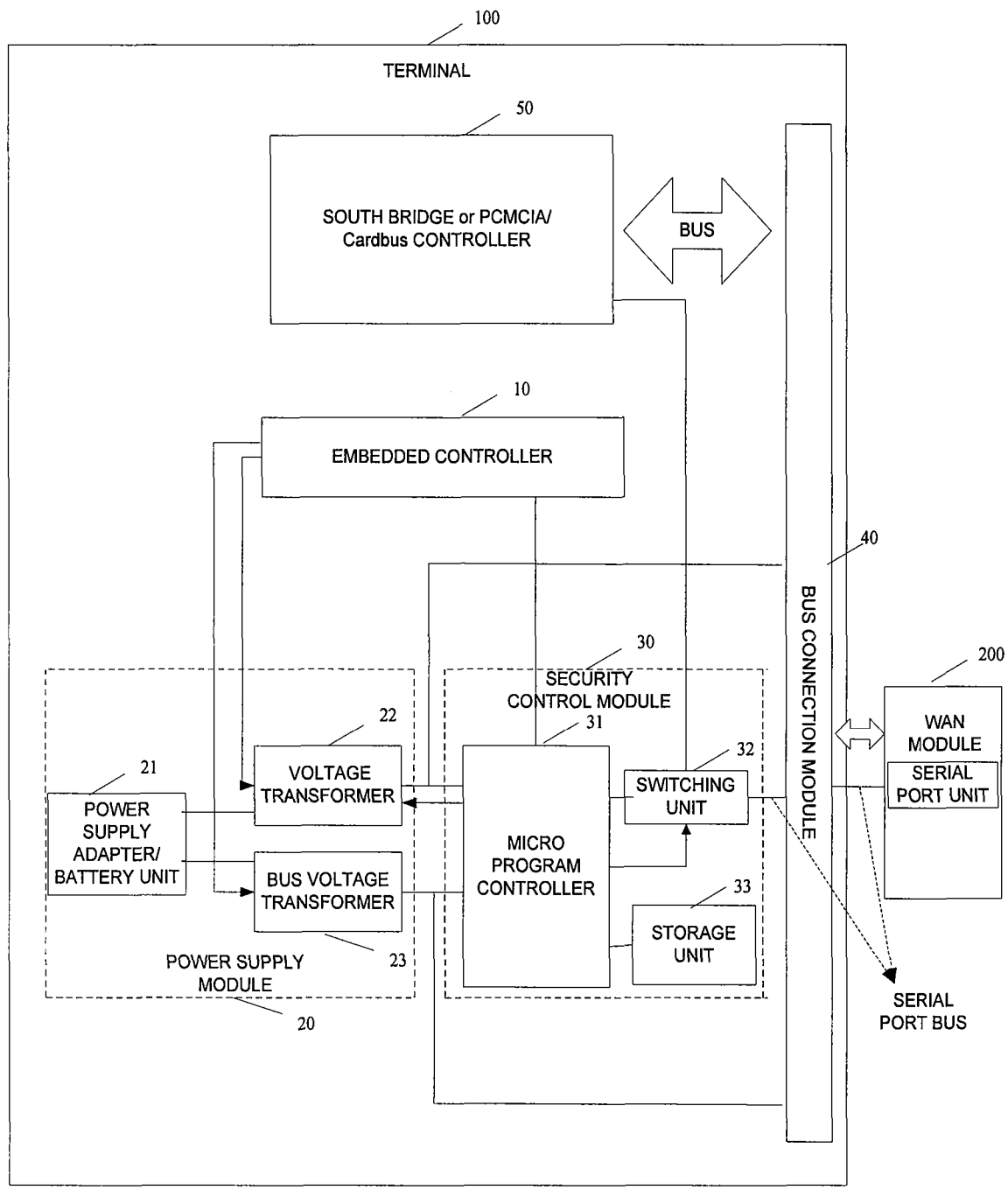
FIG. 2 is a schematic block diagram of a WAN module based remote wakeup system in another embodiment of the present invention.

Furthermore, in consideration of the compatibility of the system with the conventional WAN module, a switching unit 22 (e.g. switch) can be added between the micro program controller 31 in the security control module and the bus connection module 40, as shown in FIG. 2. When a PCMCIA/Cardbus bus connector is used as the bus connection module 40, and the PCMCIA/Cardbus bus connector is connected to the conventional WAN module, the micro program controller 31 controls the switching unit to switch the serial port bus, which performs the functions defined in the corresponding bus specification in the prior art, of the WAN module to the PCMCIA/Cardbus controller. Similarly, when a miniPCIE bus connector is used as the bus connection module 40, and the miniPCIE bus connector is connected to the conventional WAN module, the micro program controller 31 controls the switching unit to switch the serial port bus, which performs the functions defined in the corresponding bus specification in the prior art, of the WAN module to the south bridge chip.

The system shown in FIG. 2 operates in the same way as that of FIG. 1 except the difference in that, when the terminal identifies the inserted WAN module as a conventional WAN module, that is, a WAN module having no support to the function of remotely waking up the terminal, the micro program controller 31 sends a control signal to the switching unit 32 so as to switch the serial port bus, which performs the functions defined in the corresponding bus specification in the prior art, of the WAN module directly to the PCMCIA/Cardbus controller or the south bridge chip.

On the other hand, when the WAN module is identified as a WAN module that supports the function of remotely waking up the terminal, the micro program controller 31 sends a control signal to the switching unit 32 so as to switch the serial port bus of the WAN module to the micro program controller 31. In this case, if the WAN module 200 receives a SMS or an incoming phone call, it sends relevant information on the serial port bus led through the serial port unit and lead the serial port bus to the switching unit 32 via the bus connection module 40 in the terminal 100. The switching unit 32 switches the information on the serial port bus to the micro program controller 31, which then sends a command on the serial port bus via the switching unit 32 to the bus connection module 40 and then to the WAN module in order to obtain the information about the SMS or incoming phone call. Thereafter, the micro program controller 31 extracts user information and performs security verification on the extracted user information based on the security verification information. Here, the verification and subsequent process are executed in the same way as the system in FIG. 1 and will not be repeated.

Therefore, it can be concluded from the above description that the method according to the embodiments of the present invention realizes an accurate and secured WAN module based remote wakeup.

The WAN module based remote wakeup system and terminal of the present invention are not confined to only the applications mentioned in the specification and embodiments, but can be applied to any field suitable for the present invention. It is easy for those skilled in the art to achieve other advantages and make various modifications. Thus, the present invention is not limited to any specific detail, typical device or diagrammatic example shown and depicted above without departing from the general spirit and scope of the present invention defined by the claims and their equivalents.

What is claimed is:

1. A Wireless Access Network (WAN) module based remote wakeup system comprising:

a terminal having an embedded controller, a power supply module and a bus connection module;

and a WAN module having a serial port unit;

wherein a serial port bus is led from the serial port unit by the WAN module to the bus connection module in the terminal, and the terminal further includes a security control module connected to the embedded controller, the power supply module and a serial port bus led from the WAN module side by the bus connection module, respectively, and the power supply module is connected to the bus connection module; and wherein the power supply module is adapted to supply power to the security control module and the bus connection module;

the security control module comprises a micro program controller which connects with the power supply module and the embedded controller;

wherein the power supply module comprises a power supply adapter/battery unit, a voltage transformer connected to the power supply adapter/battery unit, the embedded controller, the micro program controller and the bus connection module, respectively, and a bus voltage transformer connected to the power supply adapter/battery unit, the embedded controller, the micro program controller and the bus connection module, respectively;

the embedded controller is adapted to generate an enable signal for the voltage transformer to supply power to the security control module and the bus connection module when the terminal is in power-off or sleep status, and generate the enable signal for the bus voltage transformer to supply power to the security control module and the bus connection module when the terminal is in power-on status;

the voltage transformer is adapted to reduce a voltage from the power supply adapter/battery unit according to the enable signal from the embedded controller so as to supply power to the security control module and the bus connection module;

the bus voltage transformer is adapted reduce the voltage from the power supply adapter/battery unit according to the enable signal from the embedded controller so as to supply power to the security control module and the bus connection module;

the security control module is adapted to perform security verification on information carried by a signal received on the serial port bus led from the bus connection module, generate a wakeup signal and send it to the embedded controller if the security verification is successful; and the embedded controller is adapted to start the terminal according to the received wakeup signal, wherein the micro program controller is further adapted for storing security verification information;

wherein the micro program controller is further adapted, in the power-off or sleep status of the terminal, to detect whether the WAN module is inserted in the bus connection module, perform identity verification on the inserted WAN module, and send the enable signal to the voltage transformer to stop the voltage transformer from supplying power to the security control module and the bus connection module if the identity verification on the WAN module fails.

2. The system of claim 1, wherein the security control module comprises a storage unit storing security verification information, and the micro program controller reading the security verification information stored in the storage unit, performing security verification on information carried by a signal received on the serial port bus led from the bus connection module based on the read security verification information, and generating a wakeup signal and sending it to the embedded controller if the security verification is successful.

3. The system of claim 1, wherein the terminal comprises a south bridge or PCMCIA/Cardbus controller, and the security control module further comprises a switching unit connected to the micro program controller, the south bridge or PCMCIA/Cardbus controller and the serial port bus led from the bus connection module, respectively.

4. A terminal supporting Wireless Access Network (WAN) module-based remote wakeup comprising:

the terminal having an embedded controller, a power supply module and a bus connection module, wherein the terminal further comprises a security control module connected to the embedded controller, the power supply module and a serial port bus led from the bus connection module, respectively, and the power supply module is connected to the bus connection module; and wherein the power supply module is adapted to supply power to the security control module and the bus connection module;

the security control module comprises a micro program controller which connects with the power supply module and the embedded controller;

wherein the power supply module comprises a power supply adapter/battery unit, a voltage transformer connected to the power supply adapter/battery unit, the embedded controller, the micro program controller and the bus connection module, respectively, and a bus voltage transformer connected to the power supply adapter/battery unit, the embedded controller, the micro program controller and the bus connection module, respectively;

the embedded controller is adapted to generate an enable signal for the voltage transformer to supply power to the security control module and the bus connection module when the terminal is in power-off or sleep status, and generate an enable signal for the bus voltage transformer to supply power to the security control module and the bus connection module when the terminal is in power-on status;

the voltage transformer is adapted to reduce a voltage from the power supply adapter/battery unit according to the enable signal from the embedded controller so as to supply power to the security control module and the bus connection module;

the bus voltage transformer is adapted reduce the voltage from the power supply adapter/battery unit according to the enable signal from the embedded controller so as to supply power to the security control module and the bus connection module;

the security control module is adapted to perform security verification on information carried by a signal received on the serial port bus led from the bus connection module, generate a wakeup signal and send it to the embedded controller if the security verification is successful; and the embedded controller is adapted to start the terminal according to the received wakeup signal, wherein the micro program controller is further adapted for storing security verification information;

wherein the micro program controller is further adapted, in the power-off or sleep status of the terminal, to detect whether the WAN module is inserted in the bus connection module, perform identity verification on the inserted WAN module, and send the enable signal to the voltage transformer to stop the voltage transformer from supplying power to the security control module and the bus connection module if the identity verification on the WAN module fails.

5. The terminal of claim 4, wherein the security control module comprises a storage unit storing security verification information, and the micro program controller reading the security verification information stored in the storage unit, performing security verification on information carried by a signal received on the serial port bus led from the bus connection module based on the read security verification information, and generating a wakeup signal and sending it to the embedded controller if the security verification is successful.

6. The terminal of claim 4, further comprising a south bridge or PCMCIA/Cardbus controller;

wherein the security control module further comprises a switching unit connected to the micro program controller, the south bridge or PCMCIA/Cardbus controller and the serial port bus led from the bus connection module, respectively.

* * * * *